(12) United States Patent
MacKinnon et al.

(10) Patent No.: US 10,536,421 B2
(45) Date of Patent: **\*Jan. 14, 2020**

(54) METHOD AND SYSTEM FOR FACILITATING PUBLICATION OF A MEDIA FILE AT A SCHEDULED TIME

(71) Applicant: Victory Square Media Inc., Vancouver (CA)

(72) Inventors: Ian MacKinnon, Vancouver (CA); Matthew Robert Smith, Vancouver (CA); Roger Patterson, Vancouver (CA)

(73) Assignee: Victory Square Media Inc., Vancouver (CA)

(\*) Notice: Subject to any disclaimer, the term of this patent is extended or adjusted under 35 U.S.C. 154(b) by 0 days.

This patent is subject to a terminal disclaimer.

(21) Appl. No.: 15/925,546

(22) Filed: Mar. 19, 2018

(65) Prior Publication Data

US 2018/0212917 A1 Jul. 26, 2018

Related U.S. Application Data

(63) Continuation of application No. 14/628,149, filed on Feb. 20, 2015, now Pat. No. 9,954,813.

(51) Int. Cl.
*G06F 15/16* (2006.01)
*H04L 12/58* (2006.01)
*H04L 29/08* (2006.01)

(52) U.S. Cl.
CPC ........ *H04L 51/32* (2013.01); *H04L 29/08072* (2013.01); *H04L 51/26* (2013.01); *H04L 69/329* (2013.01)

(58) Field of Classification Search
CPC .................. H04L 29/08072; H04L 29/06
USPC .................. 709/220, 223, 225, 228
See application file for complete search history.

(56) References Cited

U.S. PATENT DOCUMENTS

| | | | | |
|---|---|---|---|---|
| 8,924,493 | B1 * | 12/2014 | Yeskel | G06F 9/542 709/206 |
| 9,009,764 | B2 | 4/2015 | Walker et al. | |
| 9,192,027 | B1 | 11/2015 | Pistilli et al. | |
| 9,445,138 | B2 | 9/2016 | Walker et al. | |
| 9,495,693 | B2 | 11/2016 | Box et al. | |
| 9,674,663 | B2 * | 6/2017 | Siddiqui | H04W 4/023 |
| 9,800,534 | B2 * | 10/2017 | Odonnell-Dunn | G06F 17/30867 |

(Continued)

OTHER PUBLICATIONS

Office Action dated Jun. 27, 2016, issued by the Canadian Intellectual Property Office in Canadian Patent Application No. 2,882,836.

(Continued)

*Primary Examiner* — Khanh Q Dinh
(74) *Attorney, Agent, or Firm* — Klarquist Sparkman, LLP

(57) ABSTRACT

Methods, systems, and techniques for facilitating publication of a media file at a scheduled time. A media aggregation client sends media and a scheduling request to a media scheduling system. The media scheduling system determines when it is time to publish the media and, when the time is appropriate, sends a notification to a media publishing client. In response to the notification, the media publishing client downloads the media to a scheduled publishing application, transfers the media and the metadata to a social network application, and the social network application publishes the media to a social network.

20 Claims, 9 Drawing Sheets

(56) References Cited

U.S. PATENT DOCUMENTS

| | | | |
|---|---|---|---|
| 10,049,345 B2* | 8/2018 | Hull | G06Q 10/107 |
| 2011/0135283 A1* | 6/2011 | Poniatowki | H04N 5/76 |
| | | | 386/297 |
| 2011/0289011 A1* | 11/2011 | Hull | G06Q 10/107 |
| | | | 705/319 |
| 2011/0289153 A1* | 11/2011 | Hull | G06Q 10/107 |
| | | | 709/205 |
| 2011/0289574 A1* | 11/2011 | Hull | G06Q 10/107 |
| | | | 726/7 |
| 2012/0203846 A1* | 8/2012 | Hull | G06Q 10/107 |
| | | | 709/206 |
| 2013/0086185 A1 | 4/2013 | Desmarais | |
| 2013/0110503 A1 | 5/2013 | Scott | |
| 2013/0268962 A1* | 10/2013 | Snider | H04N 21/8547 |
| | | | 725/32 |
| 2013/0340089 A1 | 12/2013 | Steinberg et al. | |
| 2014/0122234 A1* | 5/2014 | Wald | G06Q 30/0256 |
| | | | 705/14.54 |
| 2015/0025979 A1 | 1/2015 | Box et al. | |
| 2015/0215655 A1 | 7/2015 | Walker et al. | |
| 2016/0073175 A1* | 3/2016 | Phillips | H04N 21/2402 |
| | | | 725/34 |
| 2016/0073176 A1 | 3/2016 | Phillips et al. | |

OTHER PUBLICATIONS

Elise Moreau, "Buffer App Scheduling Tool for Twitter, Facebook and Linkedin", *About.com*, https://web.archive.org/web/20141031015731/http://webtrends.about.com/od/socialnetworkingreviews/fr/Buffer-App-Scheduler-Twitter-Facebook-Linkedin.htm, Oct. 31, 2014 (Oct. 31, 2014).

Roland Waddilove, "How to schedule tweets with bufferapp.com: works with Facebook and Linkedin too", *PC Advisor*, https://pcadvisor.co.uk/how-to/social-networks/how-schedule-tweets-with-bufferappcom-3452398/, Jun. 13, 2013 (Jun. 13, 2013).

Declaration of Roger Patterson Under 37 C.F.R. §1.132, dated Sep. 7, 2017, with *Printout relating to submissions of the App to Apple and the review by Apple* (Exhibit A) and *TestFlight Terms of Service* (Exhibit B).

\* cited by examiner

METHOD AND SYSTEM FOR FACILITATING PUBLICATION OF A MEDIA FILE AT A SCHEDULED TIME

CROSS REFERENCE TO RELATED APPLICATION

This application is a Continuation of U.S. patent application Ser. No. 14/628,149, entitled "METHOD AND SYSTEM FOR FACILITATING PUBLICATION OF A MEDIA FILE AT A SCHEDULED TIME", filed Feb. 20, 2015, which application is incorporated by reference herein.

TECHNICAL FIELD

The present disclosure is directed at methods, systems, and techniques for facilitating publication of a media file, such as a still image or a video, at a scheduled time.

BACKGROUND

Online social networks, such as Facebook™, Instagram™, and Twitter™, continue to grow their number of users. Those social networks can be used to publish various types of media, such as text, still images, video, audio, and combinations thereof. In order to facilitate publishing using third party applications, online social networks may make available one or more application programming interfaces that permit those third party applications to access at least a subset of the functionality available via those social networks. In view of this, research and development accordingly continue into methods, systems, and techniques for facilitating publication of media using online social networks.

SUMMARY

According to a first aspect, there is provided a method for facilitating publication of a media file at a scheduled time. The method comprises receiving, at a media publishing client, a notification that the media file is to be published; after receiving the notification, using a scheduled publishing application running on the media publishing client to download the media file from a server to the media publishing client; and using the media publishing client to publish the media file to an online social network.

The method may further comprise, after downloading the media file from the server and before publishing the media file to the social network, using the scheduled publishing application to request approval from a user of the media publishing client to publish the media file.

The method may further comprise transferring the media file from the scheduled publishing application to a social network application running on the media publishing client, and the social network application may then publish the media file to the online social network.

The method may further comprise, after receiving the media file from the scheduled publishing application and before publishing the media file to the social network, using the social network application to request approval from a user of the media publishing client to publish the media file. After the media file is downloaded from the server and before it is transferred to the social network, the scheduled publishing application may request approval from the user of the media publishing client to publish the media file.

The method may further comprise, after receiving the notification, using the scheduled publishing application to download metadata associated with the media file from a server to the media publishing client.

The media file may comprise a still image, the metadata may comprise a caption for the still image, and the social networking application may publish the caption to the social network. At least some of the metadata may be transferred with the image to the social networking application.

The media file may comprise a video, the metadata may comprise a caption for the video, and the social networking application may publish the caption to the social network.

Prior to receiving the notification, the method may further comprise sending the media file and a scheduling request to the server, with the scheduling request indicating when the media file is scheduled to be published.

The mobile publishing client may be used to send the media file and the scheduling request.

The method may further comprise, prior to receiving the notification and after sending the media file and the scheduling request to the server, using the server to store the media file in a media store; determine at least one of a current date and time; comparing the at least one of the current date and time to when the scheduling request indicates the media file is scheduled to be published; and in response to the comparing, send the notification to the media publishing client.

According to another aspect, there is provided a mobile communication device, comprising a display; an input device; wireless communication circuitry; and an onboard computer system communicatively coupled to the display, the input device, and the wireless communication circuitry. The onboard computer system may be configured to perform any aspects of the method for facilitating publication of a media file at a scheduled time described above and suitable combinations thereof. The display may be a touchscreeen display and act as the input device.

According to another aspect, there is provided a non-transitory computer readable medium having stored thereon computer program code to cause a media publishing client to perform any aspects of the method for facilitating publication of a media file at a scheduled time described above and suitable combinations thereof.

According to another aspect, there is provided a method for facilitating publication of a media file at a scheduled time, the method comprising receiving the media file and a scheduling request from a media aggregation client, wherein the scheduling request indicates when the media file is scheduled to be published; storing the media file in a media store; determining at least one of a current date and time; comparing the at least one of the current date and time to when the scheduling request indicates the media file is scheduled to be published; in response to the comparing, sending a notification that the media file is to be published to a media publishing client; and in response to a request from the media publishing client, sending the media file to the media publishing client.

According to another aspect, there is provided a server, comprising a communications interface; a media store; and a computer communicatively coupled to the display, the input device, the communications interface, and the media store, the computer configured to perform a method for facilitating publication of a media file at a scheduled time, the method comprising receiving, via the communications interface, the media file and a scheduling request from a media aggregation client, wherein the scheduling request indicates when the media file is scheduled to be published; storing the media file in the media store; determining at least one of a current date and time; comparing the at least one of the current date and time to when the scheduling request indicates the media file is scheduled to be published; in response to the comparing, sending a notification via the communications interface that the media file is to be published to a media publishing client; and in response to a request from the media publishing client that is received via the communications interface, sending the media file to the media publishing client via the communications interface.

According to another aspect, there is provided a non-transitory computer readable medium having stored thereon computer program code to cause a server to perform a method for facilitating publication of a media file at a scheduled time, the method comprising receiving the media file and a scheduling request from a media aggregation client, wherein the scheduling request indicates when the media file is scheduled to be published; storing the media file in a media store; determining at least one of a current date and time; comparing the at least one of the current date and time to when the scheduling request indicates the media file is scheduled to be published; in response to the comparing, sending a notification that the media file is to be published to a media publishing client; and in response to a request from the media publishing client, sending the media file to the media publishing client.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
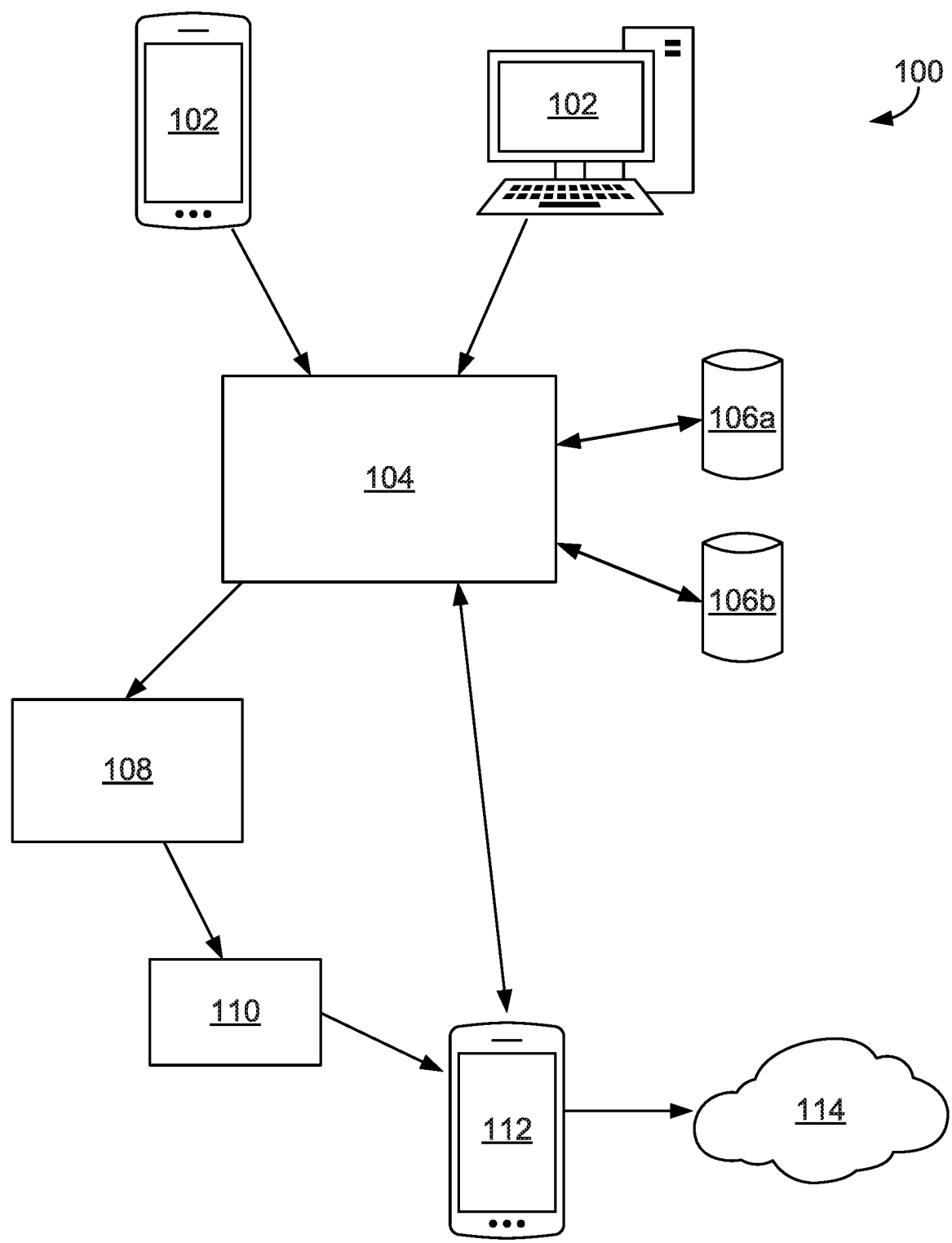
FIG. 1 is a block diagram of a system for facilitating publication of a media file at a scheduled time, according to one embodiment.

Online social networks typically allow their users to publish media in forms such as text, still images (as used herein, a reference to an "image" is a reference to a still image such as a photo unless otherwise indicated), video (including animated GIFs or similar animations), audio, and combinations thereof. The media may be published to a wide area network such as the Internet, but may also be published on a local area network such as a corporate intranet. To facilitate development of third party applications (i.e., applications owned or controlled by persons or entities other than the person or entity that owns or controls the social network), a social network may make available to the public an application programming interface ("API"). The social network's API provides access to some or all of the functionality that the network is capable of performing. For example, if the social network permits a user to post an image when that user is directly accessing the network's website via the World Wide Web, the API may similarly permit that user to post an image via a third party application that is communicative with the social network using the network's API.

Some social networks that permit users to post images or other media enforce a "just-in-time" publication policy, which means that the social network will only publish media in immediate response to a user's request to publish. In other words, when a social network enforces a just-in-time policy on media publication, a user cannot schedule a publication to occur automatically at any substantial time after instructing the social network to publish the media.

A social network may enforce a just-in-time publication policy regardless of whether a user is accessing the network via the World Wide Web, via a first party application (i.e., a non-website software application owned or controlled by the person or entity that owns or controls the social network), or via a third party application. Alternatively, a social network may only enforce a just-in-time publication policy against a user when that user is publishing media via a third party application; for example, the social network may not make available to third party developers those aspects of the network's API that permits scheduled (i.e., not just-in-time) publishing. In any event, a user of the social network who is subject to a just-in-time publication policy is limited as to when and how he or she can publish media.

The embodiments described herein are directed at facilitating scheduled publication of media on a social network; i.e., publication of that media at a scheduled time. The scheduled time may be a substantial time after the user submits the media for publication, even if the social network enforces a just-in-time publication policy. The user sends the media, such as an image, from a media aggregation client to a media scheduling system. The user also sends a scheduling request to the media scheduling system indicating the scheduled time when the media is scheduled to be published. For example, if the user sends the media and the scheduling request to the media scheduling system at 2:00 pm on a given day, the scheduling request may indicate that publication is to occur at 3:00 pm the following day. The media scheduling system stores the media and, on or about the scheduled time, sends a notification to a media publishing client indicating that the media is scheduled to be published. In response to the notification, the user is able to directly post the media to the social network. In some embodiments, this publication may be facilitated by automatically launching the social network's first party application. By facilitating scheduled publication in this manner, the social network's API may be used for scheduled publications as well, regardless of whether that API enforces a just-in-time publication policy. Additionally, the actions of selecting the media to be published and the actual act of publishing can be divided between two people, enhancing system flexibility.

Referring now to FIG. 1, there is shown one embodiment of a system 100 for facilitating publication of a media file, such as an image or video, at a scheduled time. The system 100 comprises a pair of media aggregation clients 102, an application server 104, a media store 106*a*, a non-media database 106*b*, a scheduler 108, a messaging system 110, and a mobile publishing client 112. The media store 106a and non-media database 106b are hereinafter collectively referred to as "storage 106". The mobile publishing client 112 is communicative with a social network 114. As discussed in further detail in respect of FIGS. 2 and 3 below, the media aggregation clients 102 communicate with the application server 104. The media aggregation clients 102 send the media to be published and a scheduling request, comprising a scheduled time indicating when the media is scheduled to be published, to the application server 104. The application server 104 stores the media in the media store 106a and transfers the scheduling request to the scheduler 108. On or about when the scheduled time arrives, the scheduler 108 instructs the messaging system 110 to send a notification 600 (not shown in FIG. 1, but shown in FIG. 6) to the mobile publishing client 112 reminding a user that the time has come to publish the media. In response, the user launches a scheduled publishing application (not shown) that passes the media to a social network application 320 (only labeled in FIG. 3) for publication. Upon receiving final approval from the user, the social network application 320 publishes the media to the social network 114. In FIG. 1, the application server 104, storage 106, and scheduler 108 collectively comprise a "media scheduling system" 302 (only labeled in FIG. 3). In alternative embodiments (not depicted), the media scheduling system 302 may comprise more or fewer components than the application server 104, storage 106, and scheduler 108; for example, the functionality of the application server 104, storage 106, and scheduler 108 may be combined into two or fewer units or distributed across four or more units, regardless of the names or functionality attributed to individual components in the system 302.

While in FIG. 1 the storage 106 comprises the media store 106a and the non-media store 106b, in alternative embodiments (not depicted) the two stores 106a,b may be combined or distributed between fewer or more storage devices. One example of the media store 106a is Amazon™ S3 cloud storage.

Figure 2:
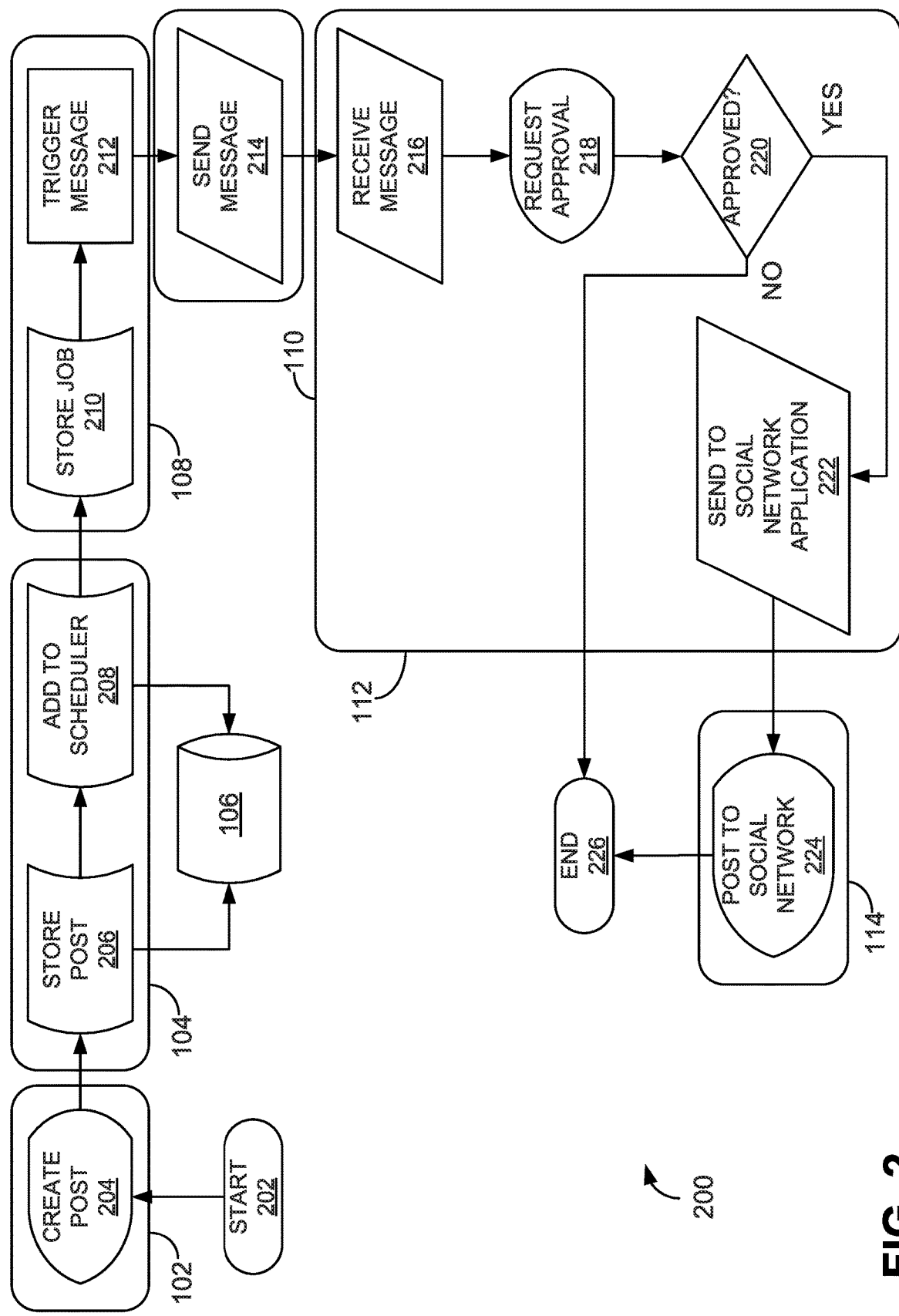
FIGS. 2 and 3 are flowcharts of methods for facilitating publication of a media file at a scheduled time, according to additional embodiments.
Figure 4:
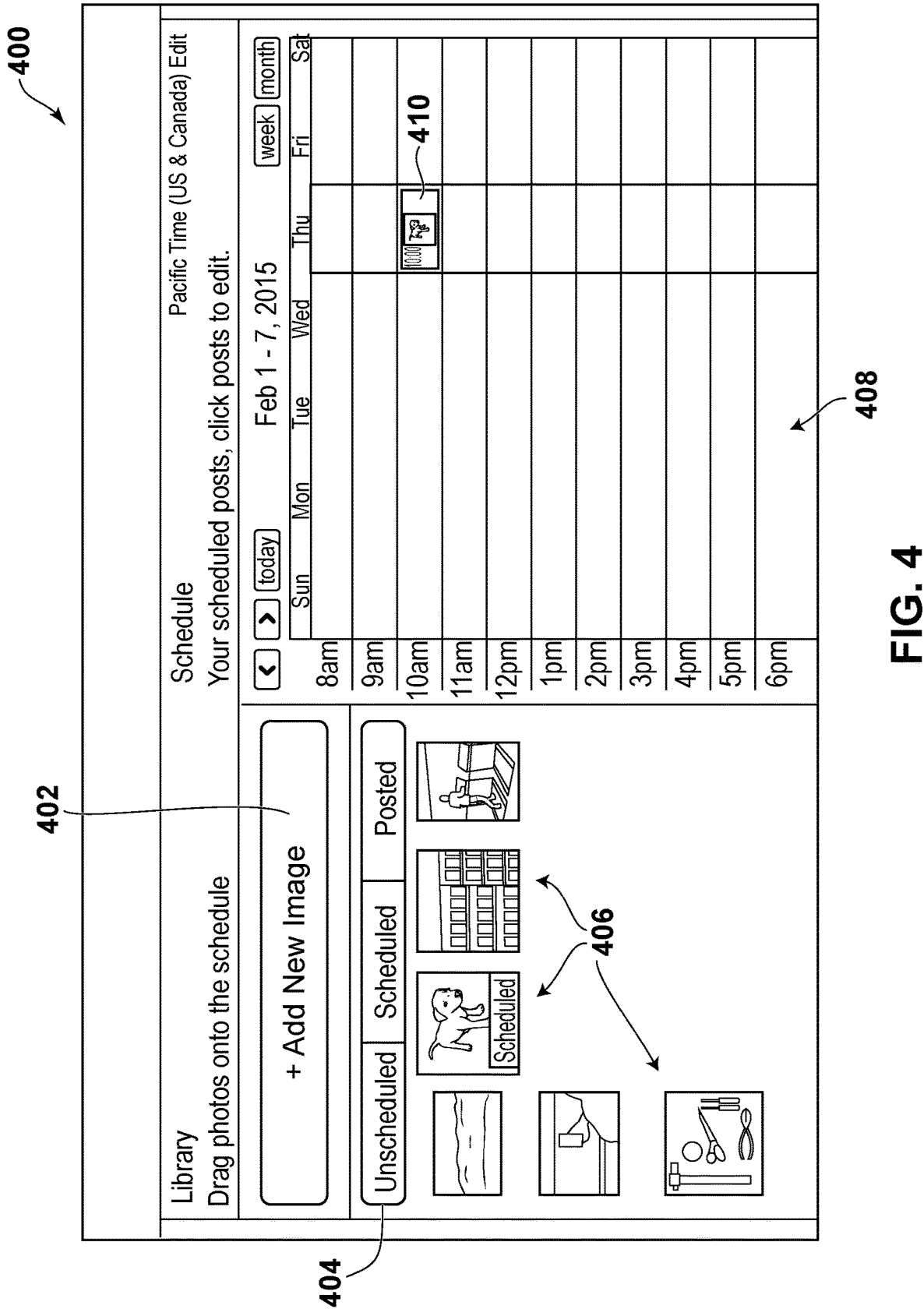
FIG. 4 is a screenshot from a media aggregation client comprising part of the system of FIG. 1.

Referring now to FIG. 2, there is shown a method 200 for facilitating publication of a media file, such as an image or video, at a scheduled time, according to another embodiment. The method 200 begins at block 202 and proceeds to block 204 where a user creates a post for publication using the media aggregation client 102. FIG. 4 shows an example screenshot 400 of the media aggregation client 102 when the media to be published comprises an image. The screenshot 400 shows various images 406 that comprise an image library of images directly accessible by the media aggregation client 102; an add image button 402 that permits the user to add a new image from, for example, a file system or a camera; a classification button 404 that classifies the images 406 as "unscheduled" (the image 406 comprises part of the image library on the media aggregation client 102 but has not yet been scheduled to be published), "scheduled" (the image 406 comprises part of the image library on the media aggregation client 102 and has been scheduled to be published but has not yet published), or "posted" (the image 406 comprises part of the image library on the media aggregation client 102 and has already been published); a calendar 408 permitting the user to schedule the images 406 for publication on the social network 114 at various days and times; and a calendar entry 410 showing when one of the images 406 has been scheduled for publication.

Figure 5:
FIG. 5 is a portion of a screenshot from the media aggregation client of FIG. 4.

If the user selects the add image button 402, the user selects a new image to be added ("new image 406") to the other images 406 shown in FIG. 4, following which the media aggregation client 102 displays a screenshot 500 as depicted in FIG. 5. This screenshot 500 shows the new image 406; a box that allows the user to enter a caption 504 for the new image 406, which is a type of metadata associated with the new image 406; and a save button 506 that sends the new image 406 to the application server 104, which in turn saves the new image 406 and the caption 504 to the media store 106a.

To create a post for publication, the user selects one of the images 406 ("selected image 406") shown in the screenshot 400 of FIG. 4. Once selected, the user drags it over to the calendar 408 and drops it on the date and time at which the user wishes the selected image 406 to be published. In so doing, the user generates the scheduling request comprising the scheduled time he or she wishes the selected image 406 to be published. Once publication has been scheduled, the media aggregation client 102 uploads the selected image 406, the scheduling request, and the caption 504 to the application server 104.

In the depicted embodiment, the media aggregation client 102 is a computer displaying a Javascript™ based interface that is served as a web page to the media aggregation client 102 by the application server 104. In this embodiment, any images 406, captions 504, and scheduling information displayed by the media aggregation client 102 is served to it from the application server 104. In alternative embodiments (not depicted), however, the media aggregation client 102 may, for example, be a mobile communication device such as a smartphone 1000 (labeled in FIG. 10) running a non-web browser application that is communicative with the application server 104, and the information that the media aggregation client 102 displays may be served by the application server 104 or stored locally by the media aggregation client 102. As discussed in further detail below, in another embodiment (not depicted) the media aggregation client 102 and the media publishing client 112 may be identical and comprise, for example, the smartphone 1000 running the scheduled publishing application.

The method 200 then proceeds to block 206, where the application server 104 creates and stores a record hereinafter referred to as the "post" within the storage 106. The post comprises one or both of the selected image 406 itself or a Uniform Resource Locator ("URL") or other type of pointer referring to the selected image 406; the scheduling request; the caption 504; and any metadata in addition to the caption 504 that is associated with the selected image 406, such as the date and location the selected image 406 was taken. The application server 104 stores the selected image 406 in the media store 106a and stores the other information comprising the post, such as the metadata, in the non-media store 106b. After storing the post, the application server 104 proceeds to block 208 where it creates a job, to be performed at the scheduled time, for the scheduler 108. As part of creating the job, the application server 104 creates a job identifier that identifies the job and stores the job identifier in the non-media store 106b.

In the depicted embodiment, the media store 106a stores the selected image 406 beyond the scheduled time the image 406 is published. Storing the image 406 past publication allows the user to easily re-publish the image 406 in the future and to be available for reference when determining analytics.

After creating the job and storing the job identifier in the non-media store 106b, the application server 104 sends the job to the scheduler 108 at block 210 and, more particularly, to a scheduling queue comprising part of the scheduler 108. The scheduling queue is an in-memory, resilient, timestamped job store that can process a large number of real-time requests. In one example embodiment, the scheduling queue is implemented using an in-memory cache, such as a Redis server, that backs up to permanent storage for resilience. After receiving the post from the application server 104, the scheduler stores the job and its associated scheduling request and post identifier, which uniquely identifies the post. The scheduler 108 also comprises a pool of worker processes that process jobs from the scheduling queue. When the scheduled publication time for one of the jobs in the scheduling queue arrives, one of the worker processes at block 212 sends a message to the messaging system 110 to send the notification 600 to the mobile publishing client 112, and at block 214 the messaging system 110 sends the notification 600. One example of the messaging system is the Apple™ Push Notification Service.

Figure 6:
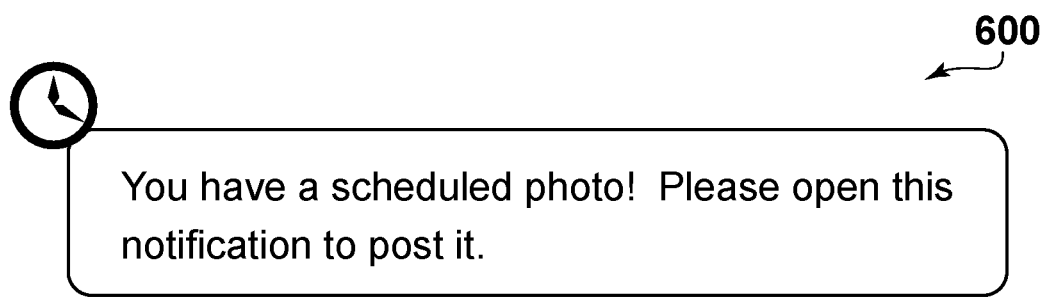
FIG. 6 is a notification displayed on a media publishing client comprising part of the system of FIG. 1.
Figure 7:
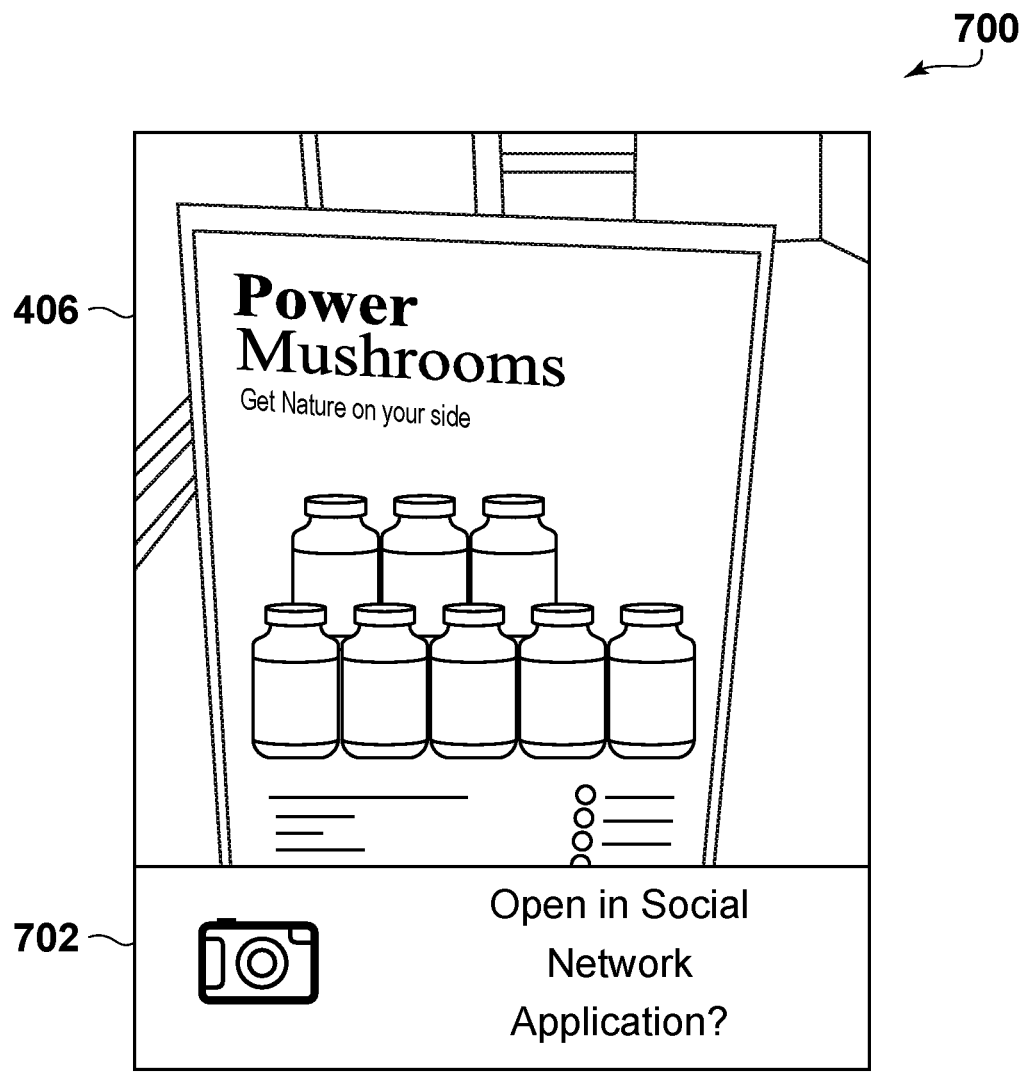
FIG. 7 is a screenshot from the media publishing client of FIG. 6, showing a scheduled publishing application running on the media publishing client.
Figure 8:
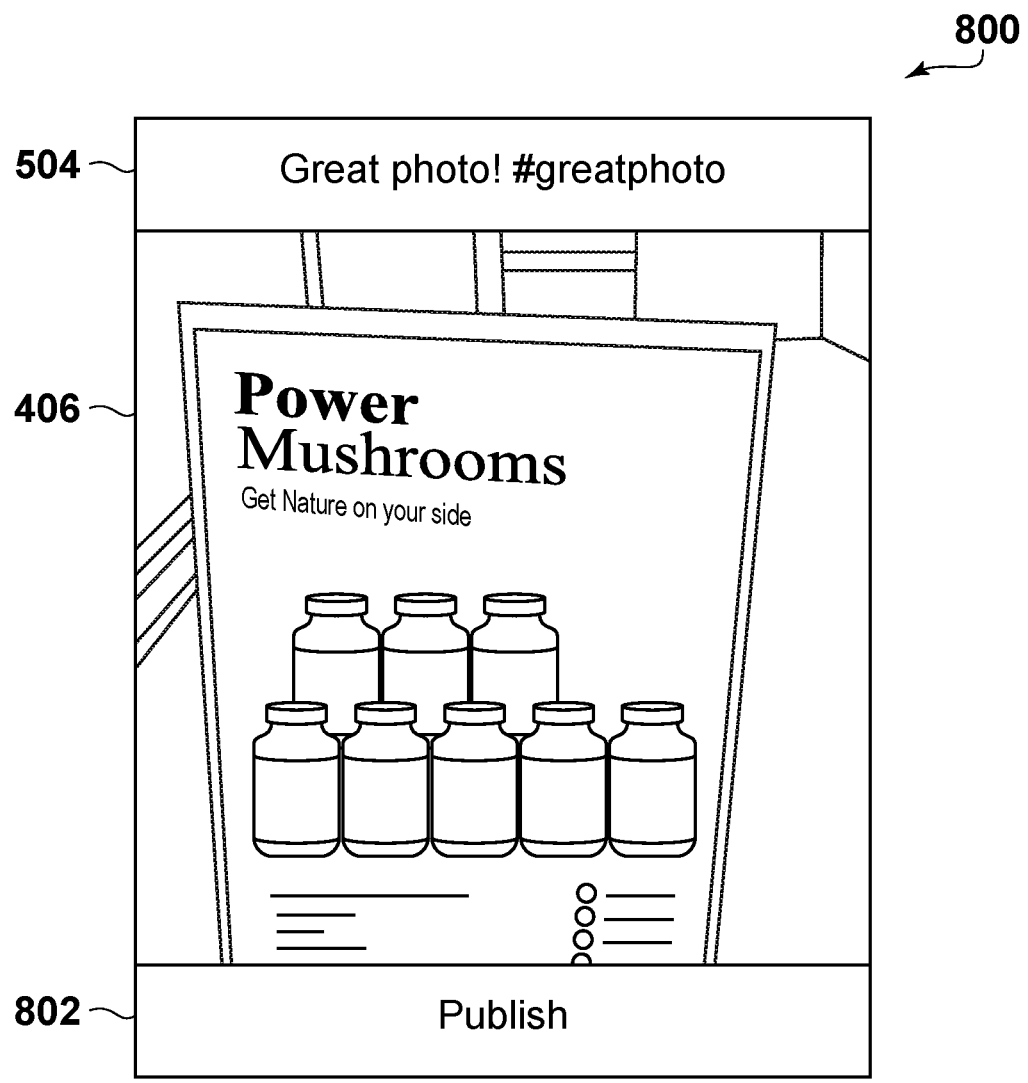
FIG. 8 is a screenshot from the media publishing client of FIG. 6, showing a social network application running on the media publishing client.

At block 216, the mobile publishing client 112 receives and displays the notification 600, such as in the manner displayed in FIG. 6. Once the user opens the notification, the mobile publishing client 112 contacts and downloads from the application server 104 the selected image 406, the caption 504, and any other relevant metadata and launches the scheduled publishing application. While not depicted, in alternative embodiments the related metadata may additionally or alternatively comprise a timestamp, an identifier that identifies the user on the social network 114, an identifier that identifies the user to the application server 104, data relating to any persons who are identified or "tagged" in the selected image 406, the nature of any image filters that have been applied to the selected image 406, the orientation of the selected image 406, and location data regarding where the selected image 406 was taken. FIG. 7 shows a screenshot 700 of the scheduled publishing application comprising the selected image 406 and a social network application button 504. Presenting the social network application button 504 is performed at block 218, and is a way for the social network application 320 to request approval to publish the selected image 406 from the user. If the user does not press the button 504 at block 220, the method 200 proceeds to block 226 and ends, and the selected image 406 is not published. However, if the user does press the button 504 at block 220, the scheduled publishing application passes the selected image 406, caption 504, and any additional metadata to the social network application 320 for publication at block 222. A screenshot 800 of the social network application 320 is shown in FIG. 8, in which the caption 504, the selected image 406, and a publication button 802 are shown. Once the user selects the publication button 802, the selected image 406, the caption 504, and any additional metadata are passed to the social network 114 for publication. If the social network application 320 is a first party application, the application typically has access to the social network's 114 entire API. The selected image 406, caption 504, and any other metadata pertinent for publication (e.g., image comments) can be published using the social network application 320, thus averting issues regarding different APIs being made available to third party vs. first party applications. The mobile publishing application 112 comprises an approval gating mechanism in that the user is presented, by the social network application 320, with the ability to approve the post immediately prior to its being published on the social network 114. By retaining the requirement that a person approve publication of the selected image 406 immediately prior to its publication, scheduled publications can be performed even using those social networks 114 that enforce a just-in-time publication policy.

In the examples above, the mobile publishing client 112 is described as being distinct from the media aggregation client 102. However, in alternative embodiments (not depicted), the mobile publishing client 112 and the media aggregation client 102 may comprise the same hardware and also, optionally, the same software. For example, the smartphone 1000 may act as both the mobile publishing client 112 and the media aggregation client 102, and the scheduled publishing application may be used both to send the images 406 or other media and metadata for publication to the application server 104 at block 204 and to download the images 406 or other media and metadata from the application server 104 at block 216.

Additionally, in some embodiments any metadata associated with the selected image 406 comprises part of the post and is stored and transferred together with the selected image 406 to the application server 104, the mobile publishing client 112, and ultimately the social network 114 for publication. In alternative embodiments, however, not all of the metadata entered by the user at the media aggregation client 102 comprises part of the post; for example, some or all of the metadata may be stored in the non-media store 106*b* but not be transferred to the scheduler 108. Additionally or alternatively, not all the metadata that initially comprises part of the post need be sent to the mobile publishing client 112 (e.g., the post may not be static and may be altered after creation but before sending to the mobile publishing client 112), nor does all the metadata need to be sent to the social network application from the scheduled publishing application.

Figure 3:
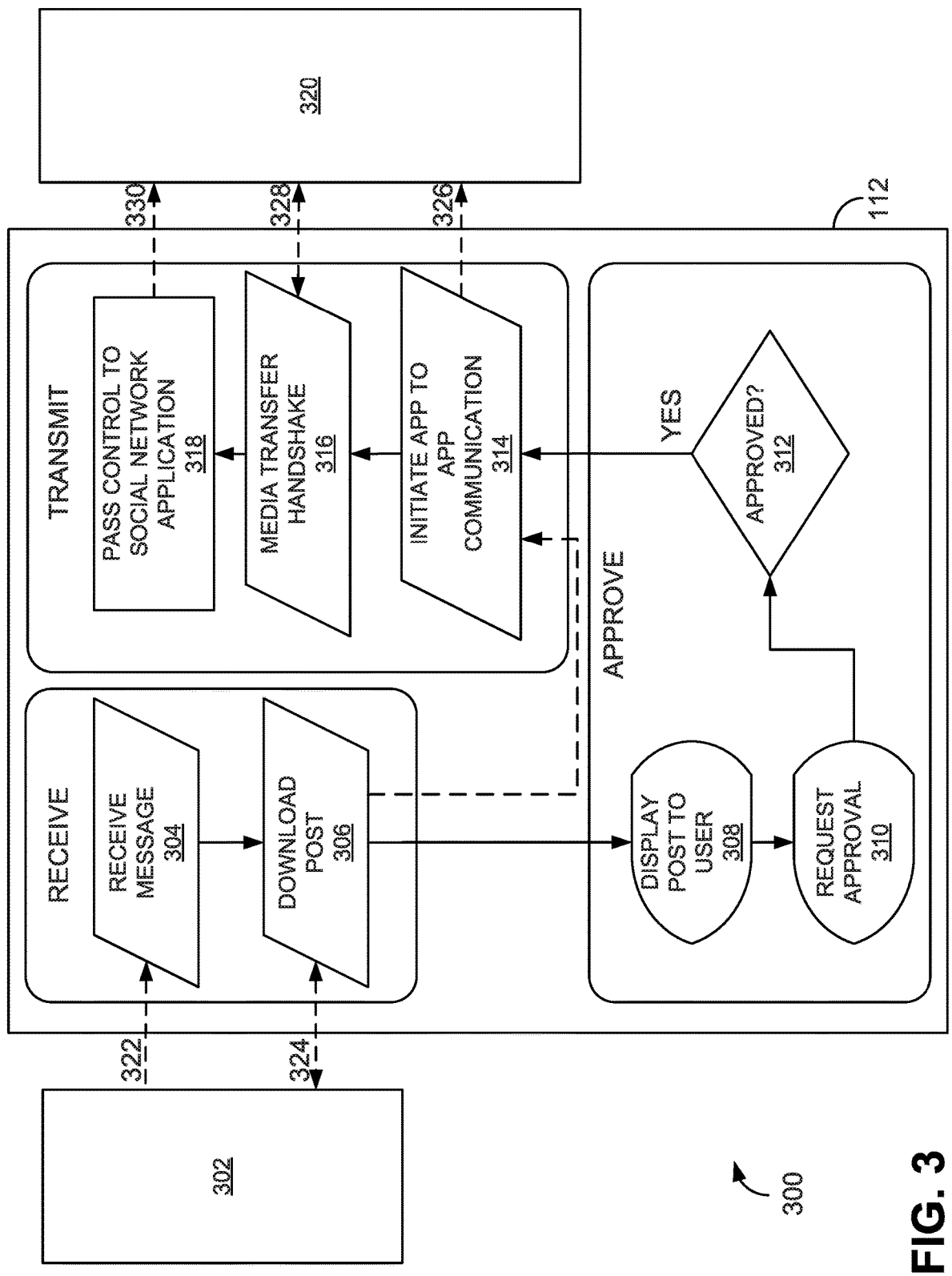

Referring now to FIG. 3, there is shown a method 300 for facilitating publication of a media file, such as an image or video, at a scheduled time, according to another embodiment. The method 300 of FIG. 3 depicts one example way of performing blocks 214 to 226 of FIG. 2. In FIG. 3, the scheduled publishing application running on the mobile publishing client 112 is shown as being communicative with each of the media scheduling system 302 and the social network application 320 via first through fifth messages 322,324,326,328,330.

Prior to the first message being sent from the media scheduling system 302 to the mobile publishing client 112, the user uploads the selected image 406 and schedules it for publication as described above in respect of blocks 202 to 210. At block 214, the media scheduling system 302 sends the notification 600 to the mobile publishing client 112 as the first message 322. The notification 600 may, for example, be sent to the operating system that the mobile publishing client 112 runs, which then displays the notification 600 and relays the notification 600 to the scheduled publishing application by launching the scheduled publishing application. The mobile publishing client 112 receives the notification 600 and communicates with the media scheduling system 302, and more particularly the application server 104, to download the post, which comprises the selected image 406 and its associated metadata; this is represented in FIG. 3 as the second message 324.

In one embodiment represented by the solid line between blocks 306 and 308, the mobile publishing client 112 then proceeds to block 308 where it displays the post to the user on the display of the mobile publishing client 112 as shown in FIG. 7 and as discussed above. As part of the display, at block 310 the mobile publishing client 112 queries the user for approval to publish to the social network 114; in FIG. 7, this is done by presenting the social network application button 702. If the user approves the publication by selecting the social network application button 702 at block 312, the mobile publishing client 112 proceeds to block 314.

In an alternative embodiment represented by the dashed line between blocks 306 and 314, the mobile publishing client 112 may bypass obtaining express approval from the user, and proceed to block 314 directly from block 306.

Regardless of the processes performed up to block 314, once at block 314 the mobile publishing client 112 initiates application-to-application communication between the scheduled publishing application and the social network application 320 at block 314 by sending the third message 326 to the social network application 320. After communication is established, the scheduled publishing application at block 316 initiates a media transfer handshake, represented by the fourth message 328, to transfer the selected image 406 and associated metadata to the social network application 320. After this data transfer, the scheduled publishing application at block 318 passes control of the mobile publishing client 112 to the social network application 320 via the fifth message 330. The social network application subsequently prompts the user to publish the image 406 on the social network 114, as shown in FIG. 8 and described above. The third, fourth, and fifth messages 326,328,330 are implemented, for example, using the API made available by the operating system of the mobile publishing client 112 and hooks that permit application-to-application communication.

In addition to the embodiments depicted in the figures, alternative embodiments are possible. For example, in one alternative embodiment the scheduled publishing application directly posts the media file (and, optionally, any metadata) to the social network 114. This may done when, for example, the social network 114 makes available an API that allows a third party application to directly post the media file to the social network 114. In such an embodiment, the scheduled publishing application may assume the role of the social network application in FIG. 8, and obtain approval from the user to post the media file immediately before the media file is posted.

The embodiments have been described above with reference to flowcharts and block diagrams of methods, apparatuses, systems, and computer program products. In this regard, the flowcharts and block diagrams in FIGS. 1 to 3 illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the blocks of the flowcharts and block diagrams.

These computer program instructions may also be stored in a computer readable medium that can direct a computer, other programmable data processing apparatus, or other devices to function in a particular manner, such that the instructions stored in the computer readable medium produce an article of manufacture including instructions that implement the function or act specified in the blocks of the flowcharts and block diagrams. The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions or acts specified in the blocks of the flowcharts and block diagrams.

Figure 9:
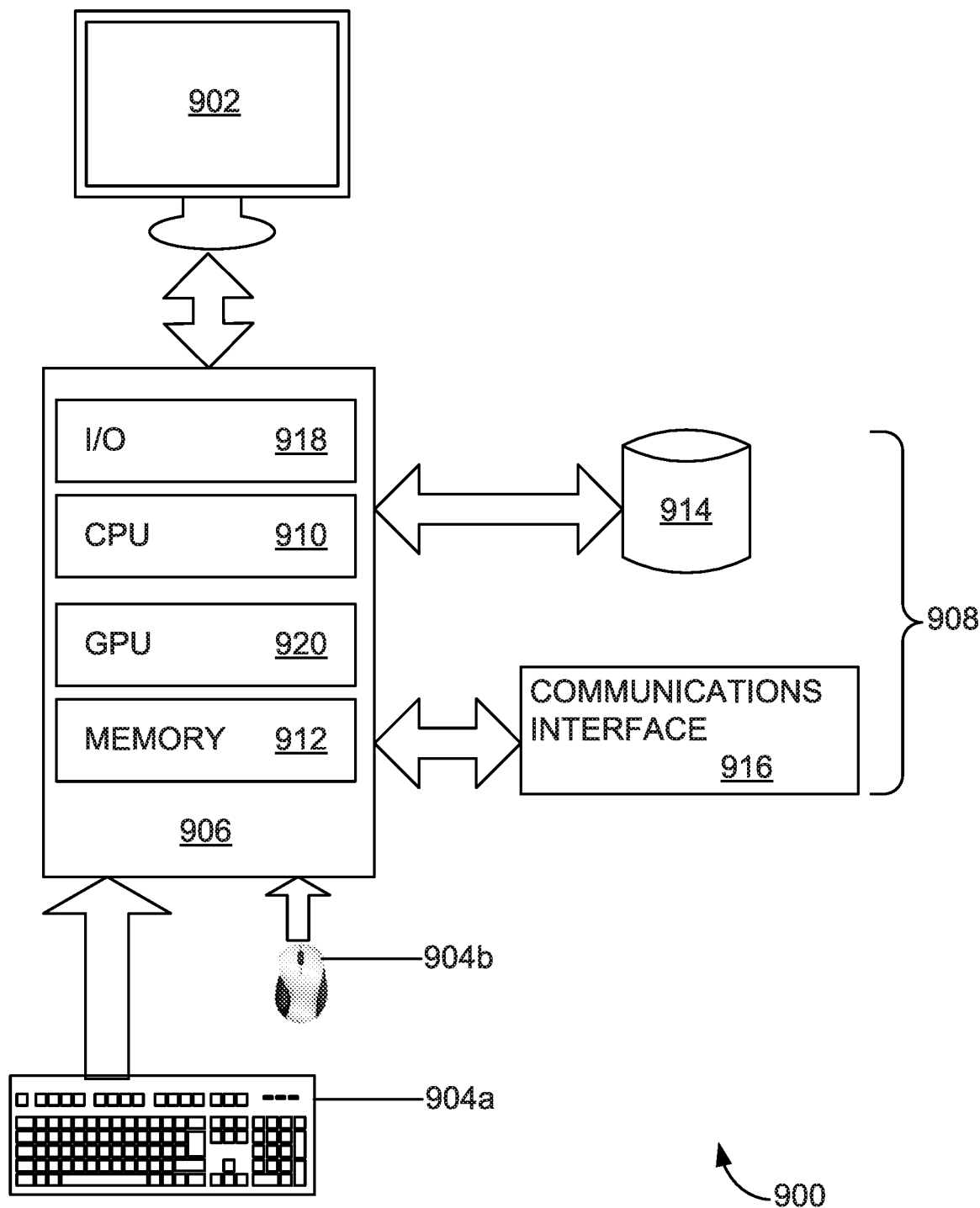
FIGS. 9 and 10 are examples of computers that can be used as components of the system of FIG. 1, such as the media aggregation client and media publishing client.

An illustrative computer system 900 in respect of which the methods herein described may be implemented is presented as a block diagram in FIG. 9. The computer system 900 may, for example, be used as the media aggregation client 102, the application server 104, or both. The computer system 900 comprises a display 902, input devices in the form of keyboard 904a and pointing device 904b, computer 906, and external devices 908. While the pointing device 904b is depicted as a mouse, other types of pointing devices may also be used. In alternative embodiments (not depicted), the computer system 900 may not comprise all the components depicted in FIG. 9. For example, the application server 104 When used as the application server 104, the computer system 900 may lack the display 902, keyboard 904a, and mouse 904b.

The computer 906 may comprise one or more processors or microprocessors, such as a central processing unit (CPU) 910, which is depicted. The CPU 910 performs arithmetic calculations and control functions to execute software stored in an internal memory 912, such as one or both of random access memory (RAM) and read only memory (ROM), and possibly additional memory 914. The additional memory 914 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 914 may be physically internal to the computer 906, or external as shown in FIG. 9, or both.

The computer system 900 may also comprise other similar means for allowing computer programs or other instructions to be loaded. Such means can comprise, for example, a communications interface 916 that allows software and data to be transferred between the computer system 900 and external systems and networks. Examples of the communications interface 916 comprise a modem, a network interface such as an Ethernet card, a wireless communication interface, or a serial or parallel communications port. Software and data transferred via the communications interface 916 are in the form of signals which can be electronic, acoustic, electromagnetic, optical, or other signals capable of being received by the communications interface 916. Multiple interfaces, of course, can be provided on the computer system 900.

Input to and output from the computer 906 is administered by the input/output (I/O) interface 918. The I/O interface 918 administers control of the display 902, keyboard 904a, external devices 908 and other analogous components of the computer system 900. The computer 906 also comprises a graphical processing unit (GPU) 920. The GPU 920 may also be used for computational purposes as an adjunct to, or instead of, the CPU 910, for mathematical calculations. However, as mentioned above, in alternative embodiments (not depicted) the computer system 900 need not comprise all of these elements. For example, the application server 104 may lack the display 902, keyboard 904a, mouse 904b, and GPU 920.

The various components of the computer system 900 are coupled to one another either directly or indirectly by shared coupling to one or more suitable buses.

Figure 10:
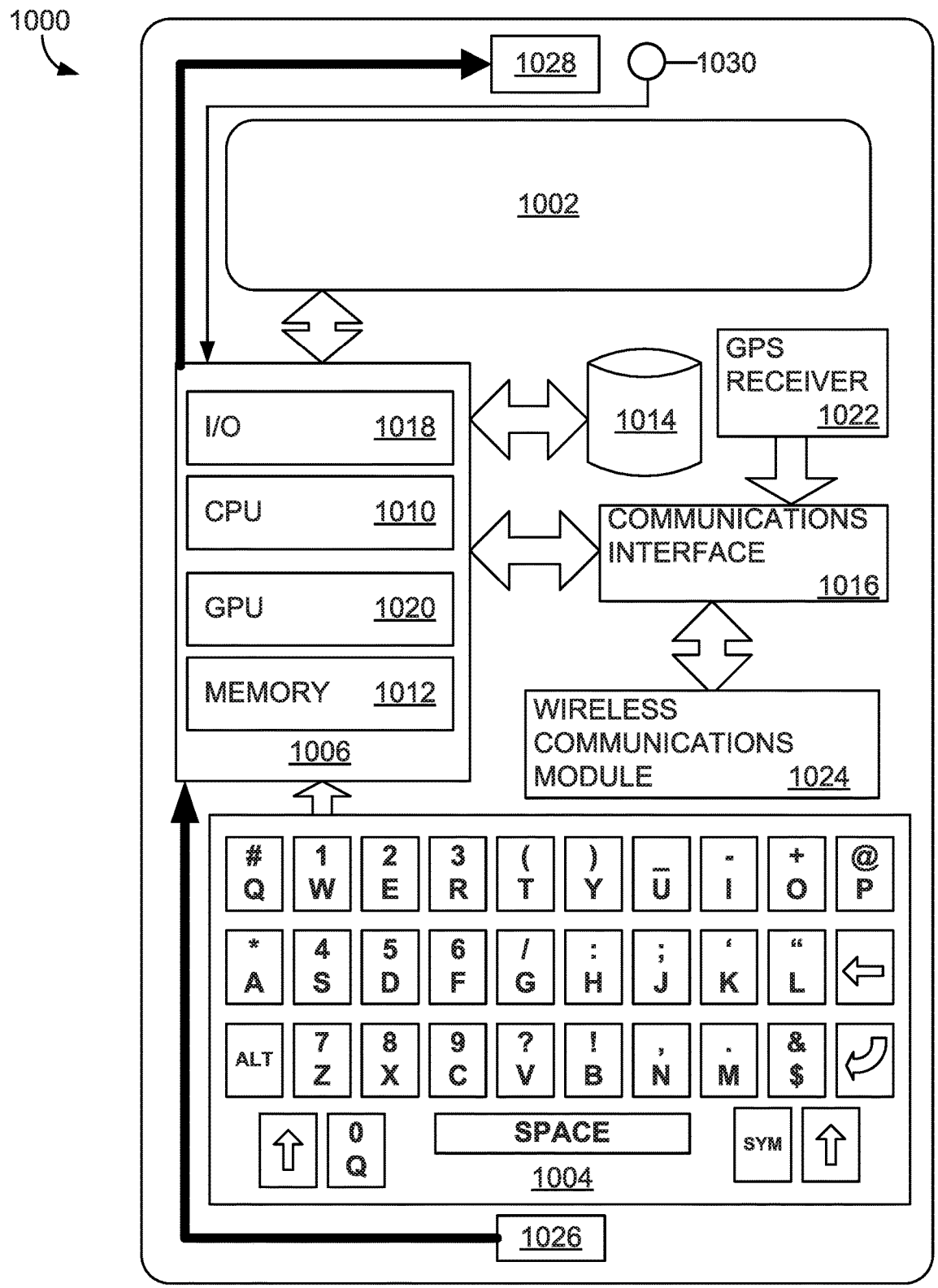

FIG. 10 shows an example networked mobile wireless telecommunication computing device in the form of the smartphone 1000. The smartphone 1000 may, for example, be used as the mobile publishing client 112, the media aggregation client 102, or both. The smartphone 1000 comprises a display 1002, an input device in the form of a keyboard 1004, and an onboard computer system 1006. The display 1002 may be a touchscreen display and thereby serve as an additional input device, or as an alternative to the keyboard 1004. The onboard computer system 1006 comprises a CPU 1010 having one or more processors or microprocessors for performing arithmetic calculations and control functions to execute software stored in an internal memory 1012, such as one or both of RAM and ROM, is coupled to additional memory 1014 that typically comprises flash memory, which may be integrated into the smartphone 1000 or may comprise a removable flash card, or both. The smartphone 1000 also comprises wireless communication circuitry that allows software and data to be transferred between the smartphone 1000 and external systems and networks. In the example embodiment of FIG. 10, the wireless communication circuitry comprises one or more wireless communication modules 1024 communicatively coupled to a communications interface 1016, which for example comprises a wireless radio for connecting to one or more of a cellular network, a wireless digital network, and a WiFi™ network. The communications interface 1016 also enables a wired connection of the smartphone 1000 to an external computer system. A microphone 1026 and speaker 1028 are coupled to the onboard computer system 1006 to support the telephone functions managed by the onboard computer system 1006, and GPS receiver hardware 1022 may also be coupled to the communications interface 1016 to support navigation operations by the onboard computer system 1006. The smartphone 1000 also comprises a camera 1030 communicative with the onboard computer system 1006 for taking photos using the smartphone 1000; in some embodiments the scheduled publishing application may, via the operating system running on the smartphone 1000, have access to those photos and may make those photos available to the scheduled publishing application when selecting an image for scheduled posting as described in respect of FIG. 4. Input to and output from the onboard computer system 1006 is administered by an input/output (I/O) interface 1018, which administers control of the display 1002, keyboard 1004, microphone 1026, speaker 1028, and camera 1030. The onboard computer system 1006 may also comprise a separate GPU 1020. The various components are coupled to one another either directly or by shared coupling to one or more suitable buses.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit," "module," or "system." Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be utilized. A computer readable medium may comprise a computer readable signal medium or a non-transitory computer readable medium used for storage. A non-transitory computer readable medium may comprise, for example, an electronic, magnetic, optical, electromagnetic, infrared, or semiconductor system, apparatus, or device, or any suitable combination thereof. Additional examples of non-transitory computer readable media comprise a portable computer diskette, a hard disk, RAM, ROM, an erasable programmable read-only memory (EPROM or flash memory), a portable compact disc read-only memory (CD-ROM), an optical storage device, a magnetic storage device, or any suitable combination thereof. As used herein, a non-transitory computer readable medium may comprise any tangible medium that can contain, store, or have encoded thereon a program for use by or in connection with an instruction execution system, apparatus, or device. Thus, computer readable program code for implementing aspects of the embodiments described herein may be contained, stored, or encoded on the memory 1012 of the onboard computer system 1006 of the smartphone 1000 or the memory 912 of the computer 906, or on a computer readable medium external to the onboard computer system 1006 of the smartphone 1000 or the computer 906, or on any combination thereof; the onboard computer system 1006 may thereby be configured to perform those embodiments.

A computer readable signal medium may comprise a propagated data signal with computer readable program code embodied therein, for example, in baseband or as part of a carrier wave. That propagated signal may take any of a variety of forms such as electro-magnetic, optical, or any suitable combination thereof. A computer readable signal medium may be any computer readable medium that is not a non-transitory computer readable medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object oriented programming language and procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One or more currently example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method for facilitating publication of a media file at a scheduled time, the method comprising:
    (a) receiving, at a media publishing client, a notification that the media file is to be published;
    (b) after receiving the notification, using a scheduled publishing application running on the media publishing client to download the media file from a server to the media publishing client;
    (c) transferring the media file from the scheduled publishing application to a social network application running on the media publishing client;
    (d) after receiving the media file from the scheduled publishing application and before publishing the media file to an online social network, using the social network application to request approval from a user of the media publishing client to publish the media file; and
    (e) using the social network application to publish the media file to the online social network.

2. A mobile communication device, comprising:
    (a) a display;
    (b) an input device;
    (c) wireless communication circuitry; and
    (d) an onboard computer system communicatively coupled to the display, the input device, and the wireless communication circuitry, the onboard computer system configured to perform a method for facilitating publication of a media file at a scheduled time, the method comprising:
        (i) receiving, via the wireless communication circuitry, a notification that the media file is to be published;
        (ii) after receiving the notification, using a scheduled publishing application running on the onboard computer system to download the media file from a server to the mobile communication device;
        (iii) transferring the media file from the scheduled publishing application to a social network application running on the onboard computer system;
        (iv) after receiving the media file from the scheduled publishing application and before publishing the media file to an online social network, using the social network application to request via the display approval from a user of the mobile communication device to publish the media file; and
        (v) publishing with the social network application the media file to the online social network via the wireless communication circuitry.

3. A non-transitory computer readable medium having stored thereon computer program code to cause a media publishing client to perform a method for facilitating publication of a media file at a scheduled time, the method comprising:
    (a) receiving, at a media publishing client, a notification that the media file is to be published;
    (b) after receiving the notification, using a scheduled publishing application running on the media publishing client to download the media file from a server to the media publishing client;
    (c) transferring the media file from the scheduled publishing application to a social network application running on the media publishing client;
    (d) after receiving the media file from the scheduled publishing application and before publishing the media file to an online social network, using the social network application to request approval from a user of the media publishing client to publish the media file; and
    (e) using the social network application to publish the media file to the online social network.

4. The non-transitory computer readable medium of claim 3, wherein the method further comprises, after receiving the notification, using the scheduled publishing application to download metadata associated with the media file from a server to the media publishing client.

5. The non-transitory computer readable medium of claim 4, wherein at least some of the metadata is transferred with the media file to the social network application.

6. The non-transitory computer readable medium of claim 5, wherein the media file comprises a still image, the metadata comprises a caption for the still image, and the social network application publishes the caption to the online social network.

7. The non-transitory computer readable medium of claim 5, wherein the media file comprises a video, the metadata comprises a caption for the video, and the social network application publishes the caption to the online social network.

8. The non-transitory computer readable medium of claim 3, wherein the method further comprises, prior to receiving the notification, sending the media file and a scheduling request to the server, wherein the scheduling request indicates when the media file is scheduled to be published.

9. The non-transitory computer readable medium of claim 8, wherein the mobile publishing client is used to send the media file and the scheduling request.

10. The non-transitory computer readable medium of claim 3, wherein the method further comprises, prior to receiving the notification and after sending the media file and the scheduling request to the server, using the server to:
 (a) store the media file in a media store;
 (b) determine at least one of a current date and time;
 (c) comparing the at least one of the current date and time to when the scheduling request indicates the media file is scheduled to be published; and
 (d) in response to the comparing, send the notification to the media publishing client.

11. A method for facilitating publication of a media file at a scheduled time, the method comprising:
 (a) receiving, at a media publishing client, a notification that the media file is to be published;
 (b) after receiving the notification, using a scheduled publishing application running on the media publishing client to download the media file from a server to the media publishing client;
 (c) after downloading the media file from the server and before transferring the media file to a social network application, using the scheduled publishing application to request approval from the user of the media publishing client to publish the media file;
 (d) transferring the media file from the scheduled publishing application to the social network application running on the media publishing client; and
 (e) using the social network application to publish the media file to an online social network.

12. A mobile communication device comprising:
 (a) a display;
 (b) an input device;
 (c) wireless communication circuitry; and
 (d) an onboard computer system communicatively coupled to the display, the input device, and the wireless communication circuitry, the onboard computer system configured to perform a method for facilitating publication of a media file at a scheduled time, the method comprising:
  (i) receiving, via the wireless communication circuitry, a notification that the media file is to be published;
  (ii) after receiving the notification, using a scheduled publishing application running on the onboard computer system to download the media file from a server to the mobile communication device;
  (iii) after downloading the media file from the server and before transferring the media file to a social network application, using the scheduled publishing application to request approval from the user of the mobile communication device to publish the media file;
  (iv) transferring the media file from the scheduled publishing application to the social network application running on the onboard computer system; and
  (v) publishing with the social network application the media file to an online social network via the wireless communication circuitry.

13. A non-transitory computer readable medium having stored thereon computer program code to cause a media publishing client to perform a method for facilitating publication of a media file at a scheduled time, the method comprising:
 (a) receiving, at a media publishing client, a notification that the media file is to be published;
 (b) after receiving the notification, using a scheduled publishing application running on the media publishing client to download the media file from a server to the media publishing client;
 (c) after downloading the media file from the server and before transferring the media file to a social network application, using the scheduled publishing application to request approval from the user of the media publishing client to publish the media file;
 (d) transferring the media file from the scheduled publishing application to the social network application running on the media publishing client; and
 (e) using the social network application to publish the media file to an online social network.

14. The non-transitory computer readable medium of claim 13, wherein the method further comprises, after receiving the notification, using the scheduled publishing application to download metadata associated with the media file from a server to the media publishing client.

15. The non-transitory computer readable medium of claim 14, wherein at least some of the metadata is transferred with the media file to the social network application.

16. The non-transitory computer readable medium of claim 15, wherein the media file comprises a still image, the metadata comprises a caption for the still image, and the social network application publishes the caption to the social network.

17. The non-transitory computer readable medium of claim 15, wherein the media file comprises a video, the metadata comprises a caption for the video, and the social network application publishes the caption to the social network.

18. The non-transitory computer readable medium of claim 13, wherein the method further comprises, prior to receiving the notification, sending the media file and a scheduling request to the server, wherein the scheduling request indicates when the media file is scheduled to be published.

19. The non-transitory computer readable medium of claim 18, wherein the mobile publishing client is used to send the media file and the scheduling request.

20. The non-transitory computer readable medium of claim 13, wherein the method further comprises, prior to receiving the notification and after sending the media file and the scheduling request to the server, using the server to:
 (a) store the media file in a media store;
 (b) determine at least one of a current date and time;
 (c) comparing the at least one of the current date and time to when the scheduling request indicates the media file is scheduled to be published; and
 (d) in response to the comparing, send the notification to the media publishing client.

* * * * *